United States Patent [19]
Vannucci

[11] Patent Number: 5,740,165
[45] Date of Patent: Apr. 14, 1998

[54] WIRELESS TDMA TRANSMITTER WITH REDUCED INTERFERENCE

[75] Inventor: Giovanni Vannucci, Township of Middletown, N.J.

[73] Assignee: Lucent Technologies Inc., Murray Hill, N.J.

[21] Appl. No.: 608,878

[22] Filed: Feb. 29, 1996

[51] Int. Cl.⁶ .................................................. H04J 3/00
[52] U.S. Cl. ........................ 370/330; 370/337; 370/442; 370/528
[58] Field of Search ...................... 370/95.3, 95.1, 370/84, 50, 69.1, 73, 310, 314, 321, 324, 326, 328, 329, 330, 331, 332, 336, 337, 341, 345, 347, 348, 350, 431, 442, 443, 498, 522, 527, 528, 529; 455/91, 126, 63, 31.1, 33.1, 39, 67.1; 379/56, 58, 59

[56] References Cited

U.S. PATENT DOCUMENTS

| | | | |
|---|---|---|---|
| 4,517,562 | 5/1985 | Martinez | 340/825.07 |
| 4,521,912 | 6/1985 | Franke et al. | 455/115 |
| 5,201,060 | 4/1993 | Haruyama et al. | 455/45 |
| 5,252,979 | 10/1993 | Nysen | 342/50 |

OTHER PUBLICATIONS

Barbaro et al., Do European GSM Mobile Cellular Phones Pose a Potential Risk to Pacemaker Patients?, PACE, vol. 18, pp. 1218–1224.

PCT International Application No. WO 92/06546, published Apr. 16, 1992.
UK Patent Application GB 2 238 449A, published May 29, 1991.

*Primary Examiner*—Alpus H. Hsu
*Assistant Examiner*—Kwang Bin Yao

[57] ABSTRACT

Low-frequency interference components produced by a time division multiple access (TDMA) portable radio transmitter that might potentially interfere with devices sensitive to low frequencies, such as cardiac pacemakers, are substantially produced. In those TDMA frames in which a protocol calls for either a burst of an information-bearing signal to not be transmitted in its designated time slot, or transmitted at a reduced power level, or for a shorter duration, an interference-compensating signal at a compensation frequency other than the transmitter's carrier frequency is transmitted. The interference-compensating signal is transmitted in the time slot in which the transmitter normally transmits the burst at a power level equal to the power level of the burst. If the protocol calls for a reduced power burst, the interference-compensating signal is transmitted within an adjacent time slot at a power level that compensates for the reduced burst power level. If the protocol calls for a shorter burst length, the interference-compensating signal is transmitted within the same time slot to extend the burst to the length of the time slot. The interference caused by the compensating signal is substantially the same as would have been caused by the information-bearing signal, so that the interference pattern remains unchanged. This eliminates low-frequency variations in the interference pattern.

42 Claims, 4 Drawing Sheets

WIRELESS TDMA TRANSMITTER WITH REDUCED INTERFERENCE

TECHNICAL FIELD

This invention relates to radio transmitters using time division multiple access (TDMA) and, more specifically, to methods and apparatus which reduce baseband envelope interference from such transmitters.

BACKGROUND OF THE INVENTION

Baseband envelope interference caused by radio transmissions is a well-known problem. It differs from conventional radio interference in that the device that is interfered with is not intended to receive radio signals at the frequency of the signal causing the interference. It occurs because virtually all electronic devices contain wires that can act as antennas, and semiconductors that can act as rectifiers or detectors. A spurious antenna can pick up a radio signal and a spurious rectifier can convert it into a voltage (or current) proportional to the instantaneous power of the radio signal. This spurious voltage (or current) signal has the potential to disrupt the operation of the electronic device if it resembles the signals normally handled by the device. For example, if the interfering radio signal exhibits envelope variations at frequencies within the audible range, it can interfere with devices such as hearing aids and audio tape recorders. Similarly, if the envelope variations occur at frequencies in the range of a few Hertz, which are typical of the signals handled by cardiac pacemakers, or fire and burglar alarms, the radio signal has the potential to interfere with such devices.

While baseband envelope interference is an old problem, it has recently become particularly important because of two factors: a) the ubiquity of portable communication devices capable of transmitting at high RF power levels (most notably, cellular telephones); and b) the advent of digital communication standards based on time division multiple access. The second factor is important because the major cause of disruption comes from the time variations in the transmitted RF power. A transmitted radio signal with a constant envelope is relatively harmless. Therefore, conventional analog cellular telephones, which use frequency modulation (FM) with a frequency division multiples access (FDMA) scheme are not a major source of baseband interference because they transmit a signal whose instantaneous power level is substantially constant in time. By contrast, TDMA is characterized by short bursts of powerful radio transmission separated by longer gaps during which no transmission takes place. These wide variations in the transmitted radio power are a known cause of unwanted interference.

A mobile radio transmitter in a TDMA system transmits a burst of an information-bearing signal, such as a coded speech signal, at a carrier frequency within a designated time slot within a defined frame of fixed duration. The successive bursts of the information-bearing signal are transmitted in the same time slot in successive frames. Both the time slot and the frequency used by the transmitter are assigned by a system controller. While one transmitter in a system is transmitting in one specific time slot, other transmitters are simultaneously operating at the same frequency using the other time slots within the frame. Other transmitters within the system are also simultaneously operating in a similar manner at other carrier frequencies. TDMA transmission techniques are used in various systems such as the Global Systems for Mobile Communication (GSM), IS-54 of the Telecommunications Industry Association (TIA), Japanese Digital Cordless (JDC). Other similar types of time division techniques are time division duplexing (TDD) (used, for example, in CT-2), and hybrid TDMA/TDD systems such as the personal handy phone (PHP) and digital European cordless telephone (DECT). For the purposes of this specification, TDMA, TDD and TDMA/TDD systems shall all be referred to as TDMA systems.

Figure 1:
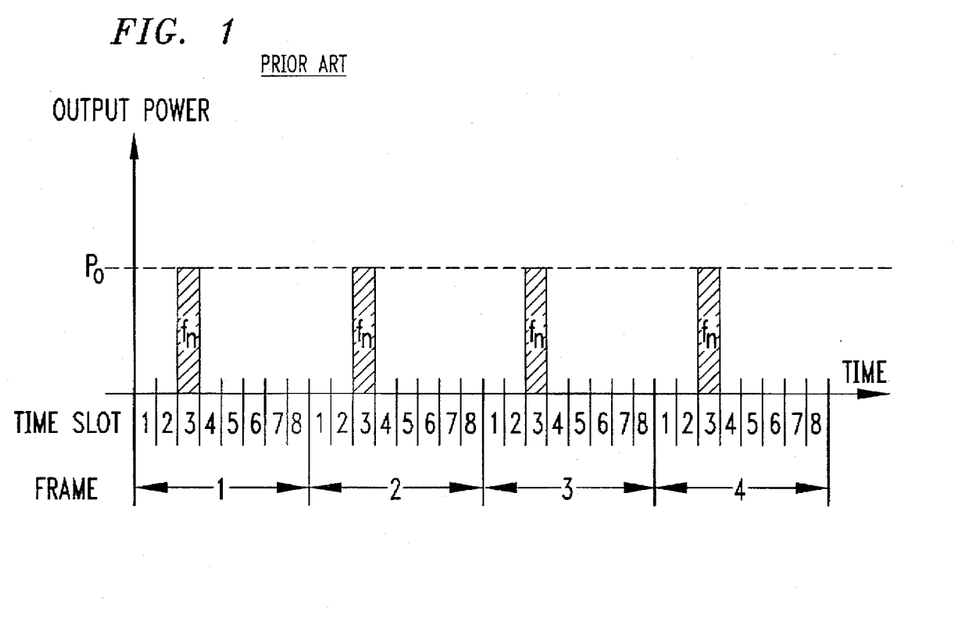
FIG. 1 shows the steady-state output power versus time relationship for a prior-art mobile TDMA radio transmitter operating under the GSM protocol.

FIG. 1 shows the steady-state output power versus time relationship for TDMA transmission as might occur in a portable radio transmitter that complies with the GSM standard. As can be noted, time is subdivided into TDMA frames, which are then further subdivided into eight transmission time slots. A particular radio transmitter transmits at a particular power level ($P_0$ for example), in a particular time slot (slot #3, for example), and at a particular frequency ($f_n$, for example). Thus, in accordance with the GSM standard, up to eight independent portable TDMA radios in separate wireless terminals are able to time-share a single frequency channel for simultaneous calls. Each TDMA radio is in a "transmit mode" during its assigned time slot and in a "quiet mode" during the remaining time slots.

Based on the pattern of FIG. 1, the frequency spectrum of the baseband envelope interference caused by a TDMA mobile radio that complies with the GSM standard can be calculated. Inasmuch as there is a signal component occurring during one time slot each frame, there is a strong component at a fundamental frequency equal to the TDMA frame rate (which is approximately 217 Hz for GSM). There is also a somewhat weaker component at the second harmonic frequency equal to twice the TDMA frame rate, and progressively weaker components at all the harmonic multiples of the TDMA frame rate.

A prior art method for eliminating the interference from these potentially interfering signal components at the frame rate and its multiples in such a TDMA transmission system is disclosed in UK Patent Application GB 2 238 449 A, published May 29, 1991. As disclosed therein, an additional signal is transmitted by the TDMA transmitter in all of the other seven time slots at a different frequency but at the same power level as the signal transmitted in the assigned time slot. In that way the transmitter is always transmitting a signal of continuous output power, thereby eliminating the signal components at the fundamental frequency and at all of its harmonics. Disadvantageously, however, transmitting a signal of continuous power throughout the entire TDMA frame each and every frame requires substantially larger battery consumption and requires a transmitter amplifier capable of dissipating much larger average power levels. Both factors would disadvantageously lead to a larger and heavier transmitter. Furthermore, the tunable oscillator (or frequency synthesizer) in the TDMA transmitter would need to switch quickly between the frequency of the information-bearing burst during the assigned slot and the frequency used for transmission during the rest of the frame. This requirement may greatly increase the cost of the oscillator and thus the transmitter. For these reasons, such a method for reducing the signal components at the fundamental frequency and its harmonics is thus not likely to find widespread adoption in such TDMA radio transmitters.

As previously noted, interference at 217 Hz and its multiples may cause interference with certain devices such as hearing aids and audio tape recorders. Interference at much lower frequencies in the order of a few Hertz, also as previously noted, may cause interference with devices such as cardiac pacemakers and burglar and fire alarms. TDMA transmission under the GSM standard during steady-state communication conditions does not have signal components at such low-frequencies. However, there are situations, such as during call setup, where the GSM protocol prescribes that the mobile transmitter not transmit in certain occurrences of the TDMA frame. When that happens, the frequency spectrum of the baseband envelope interference exhibits components at frequencies lower than the TDMA frame rate. In particular, it is known that a mobile radio terminal complying with the GSM standard can, at times, cause baseband envelope interference at low frequencies around 2 Hz and 8 Hz. These frequencies are known to cause disruption in the operation of cardiac pacemakers and sensors of various types. (see, e.g. V. Barbaro et al., "Do European GSM Mobile Cellular Phones Pose a Potential Risk to Pacemaker Patients?", *Pace*, June 1995, pp. 1218–1224).

An object of the present invention is to reduce the potentially interfering low-frequency signal components caused by TDMA mobile radio transmitters.

SUMMARY OF THE INVENTION

In accordance with the present invention, a TDMA portable radio transmitter selectively transmits within at least one time slot, but in less than all the time slots, a non-information-bearing interference-compensating signal at a predetermined compensation frequency designated for such purposes that is other than the transmitting frequency assigned to the transmitter, in order to compensate for variations in the signal power in the transmitter's designated time slot imposed by a communications protocol of the radio system. Thus, if the communications protocol requires, for example, that the radio transmitter omit or skip transmitting an information-bearing signal burst in one or more TDMA frames, the transmitter transmits in such frames the non-information-bearing interference-compensating signal at the compensation frequency and at the same signal power used in the other frames to transmit information bursts. In a similar manner, if the communications protocol requires that the radio transmitter transmit an information-bearing signal burst that is shorter than the time slot during its designated time slot in one or more TDMA frames, then the interference-compensating signal is transmitted adjacent to the information-bearing burst within the same or a nearby time slot at the compensation frequency and at the power of the information-bearing signal burst.

DETAILED DESCRIPTION

Figure 2:
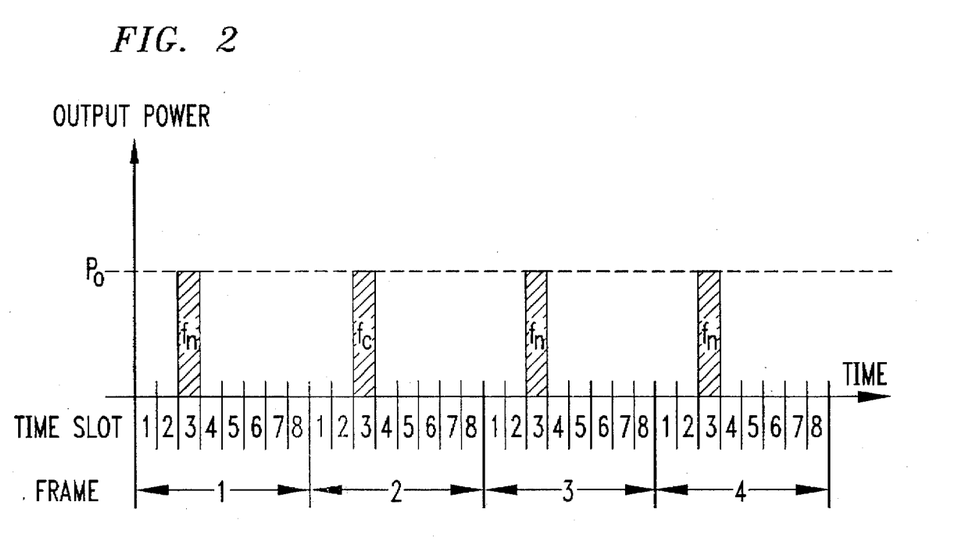
FIG. 2 shows the output-power versus time relationship for a mobile TDMA radio transmitter for which, in one illustrated frame, the protocol specifies that an information-bearing burst not be transmitted and, in accordance with the present invention, a non-information-bearing interference-compensating signal at the compensation frequency is transmitted in its place.

With reference to FIG. 2, information-bearing signals are transmitted during time slot 3 of frames 1, 3 and 4 of a mobile TDMA radio transmitter operating under the GSM protocol. The transmitter transmits at a particular power level ($P_0$) and at a particular frequency ($f_n$). The protocol may require that no information-bearing signal be transmitted at frequency $f_n$ in certain frames, such as frame 2 in FIG. 2. In accordance with the present invention, in order to minimize the low-frequency signal components that would arise from a pattern in which no signal power is transmitted during certain frames, the transmitter is modified to transmit during each of such time slots a non-information-bearing interference-compensating signal at substantially the same signal power, $P_0$, but at a compensation frequency, $f_c$, designated for such transmissions. Thus, when the protocol requires that a particular radio not transmit in certain TDMA frames, the radio instead transmits in those frames at substantially the same signal power as in the other frames where it is required to transmit an information-bearing signal, using the same time slot but at the frequency of the interference-compensating channel. A particular frequency channel is designated as a communal interference-compensating channel that is shared by all TDMA radio transmitters on a system. In a typical application, the frequency of the interference-compensating channel is sufficiently close (within a few percent, for example) to that of the information-bearing channel such that the behavior of the transmitting antenna and the parasitic receiving antenna in a unit suffering the interference are essentially the same. As a result, the amount of baseband envelope interference will be substantially the same and there will be no frequency components below the TDMA frame rate.

The need to sacrifice one frequency channel for use as an interference-compensating channel means that the total system capacity is somewhat reduced. Since the interference-compensating channel is shared among all transmitters and all cells of a cellular system, however, only one interference-compensating channel is required. For example, in the GSM standard there are 124 frequency channels. If a single channel is designated as an interference-compensating channel, the reduction in system capacity is only 0.8%. If an entire frequency channel is not designated as the interference-compensating channel, in another embodiment of the present invention a subset of the TDMA frame time slots are designated as interference-compensating time slots to be used at a particular compensation frequency, $f_c$. Thus, only certain TDMA time slots in the interference-compensating channel are designated for compensation purposes. The remaining slots at the compensation frequency are available for information-bearing signals. As in the previously discussed embodiment of the invention, the TDMA radio transmits a burst in each and every TDMA frame. However, in this embodiment, when the protocol calls for an information-bearing burst to not be transmitted in a certain frame, an interference-compensating burst is transmitted in the interference-compensating slot nearest the position of the slot carrying the information-bearing bursts at the compensation frequency. With this variant of the invention, the desired reduction in frequency components below the TDMA frame is not as great. The extent of the reduction is dependent upon how many slots in the TDMA frame are designated as interference-compensating time slots, with more being better.

It should be noted that, in either case, it is not necessary for all transmitters in a TDMA system to implement the interference-reduction technique. For example, the technique might be implemented as an option in the transmitters used by wearers of pacemakers. In this case, the system controller would instruct these select transmitters to use a particular compensating frequency that can be assigned dynamically, as needed. Most of the time, when only phones that do not require the technique are in use, the compensating frequency is available for normal communications use.

Figure 3:
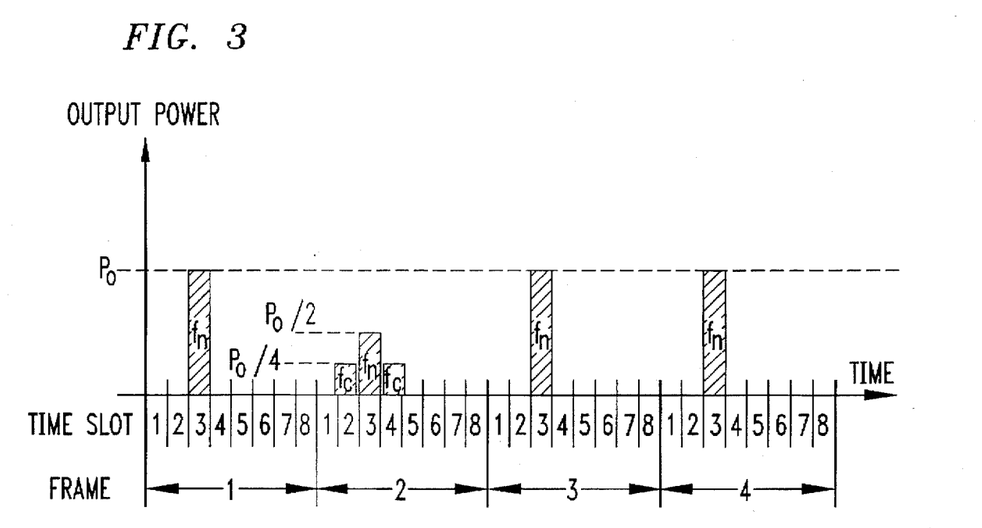
FIG. 3 shows the output power versus time relationship for a mobile TDMA radio transmitter for which the protocol specifies that the information-bearing burst be transmitted at a reduced power level during a specified frame and an interference-compensating signal is transmitted during such frame at the compensation frequency to compensate for such reduced power.

In another embodiment, if a particular protocol calls for the transmission of an information-bearing burst at a reduced power level during its assigned time slot in certain frames, then to compensate for the low-frequency signal components that would otherwise arise, an interference-compensating burst is transmitted during such frames at the compensation frequency in one or more adjacent or near-by time slot at a power level that compensates for the reduced power level of the information-bearing burst. Thus, as shown in FIG. 3, the output power of the information-bearing-burst transmitted in slot 3 is reduced by half to $P_0/2$ in frame 2 in accordance with a protocol. Thus, an interference-compensating signal is transmitted at the compensation frequency $f_c$ in time slots 2 and 4 at the power level $P_0/4$. Note that in FIG. 3, the transmitter needs to quickly switch from the frequency $f_c$ of the compensating signal to the frequency $f_n$ of the information-bearing burst between slots 2 and 3, and again from the frequency $f_n$ of the information-bearing burst, to the frequency $f_c$ of the compensating signal between slots 3 and 4. A small gap (shown somewhat exaggerated in FIG. 3), during which no transmission occurs, is therefore required at each transition in order to avoid spurious transmission at unwanted frequencies while the transmitter switches from the compensating signal to the information-bearing burst and from the information-bearing burst to the compensating signal. This gap can be made as long as necessary to allow the tunable oscillator (or frequency synthesizer) in the transmitter to switch frequencies. By keeping the gap small compared to the duration of a burst, the advantageous reduction of baseband envelope interference will be substantially the same. In order for the total signal energy (power×duration) of the reduced-power burst plus the compensating signal to equal the signal energy of a burst in a frame in which a full power information-bearing burst is transmitted, the compensating signal is extended beyond the slot boundaries to compensate for the necessary gap. Thus, in FIG. 3, the compensating signal in slot 2 commences in slot 1, and in slot 4, extends into slot 5.

In a further embodiment of the invention, the interference-compensating signal may have a higher instantaneous power over a shorter duration of time than the power and duration, respectively, of the information-bearing burst it is replacing. Similarly, the interference-compensating signal may have a lower instantaneous power over a longer duration of time than the power and duration, respectively, of the information-bearing burst it is replacing. Essentially, the energy of the interference-compensating signal should substantially equal the energy of the information-bearing burst it is intended to replace.

Figure 4:
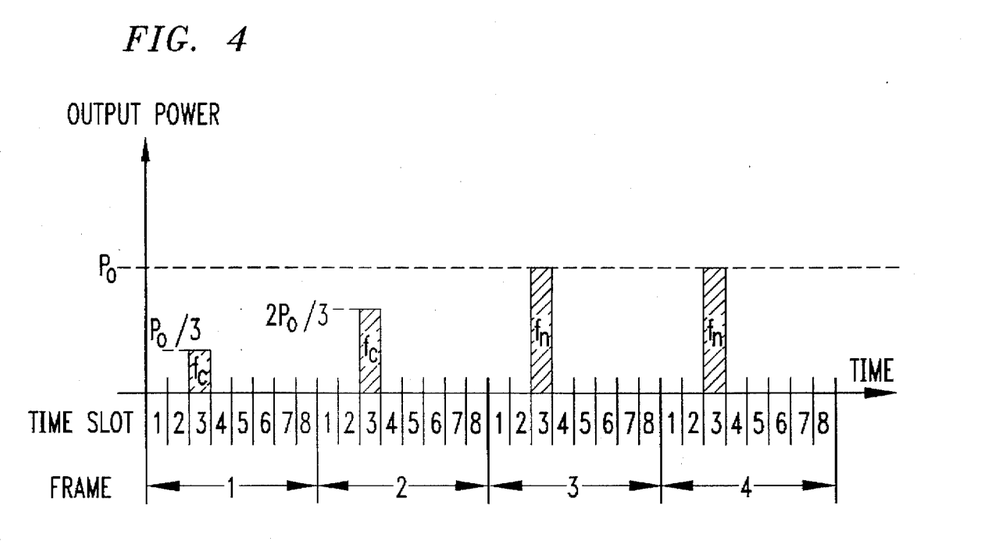
FIG. 4 shows the output power versus time relationship for a mobile TDMA radio transmitter upon turn-on for which, in accordance with the invention, an interference-compensating signal at the compensation frequency is transmitted at increasing power levels in several frames prior to the transmission of the first information-bearing burst at full power level.

In a similar manner, when a portable radio is first turned on and starts transmitting at full power in its assigned time slot in every frame, the abrupt change from zero power output to full power output creates low-frequency components. In accordance with the invention, an interference-compensating signal is transmitted at the compensation frequency in the initial frames, at increasing power levels in successive frames, prior to the commencement of transmission of the information-bearing bursts. As shown in FIG. 4, an interference-compensating signal is transmitted at the power level of $P_0/3$ at compensation frequency $f_c$ during time slot 3 of frame 1, and at power level $2P_0/3$ at frequency $f_c$ during time slot 3 of frame 2. In frame 3, the information-bearing burst is transmitted at full power, $P_0$, at its assigned frequency $f_n$ during its assigned time slot 3. The gradual introduction of transmitted power thus reduces the low-frequency signal components produced.

It has been heretofore assumed that all transmission bursts have the same duration, i.e., the length of a time slot. In some system this in fact may not be true. For example, in the GSM standard, the so-called "random access channel" bursts are shorter than regular bursts. Two techniques of the present invention can be applied to such systems.

In accordance with the first technique, when transmitting in the interference-compensating channel, the duration of the interference-compensating burst is adjusted to match the duration of the corresponding information-bearing bursts. A system can be envisioned where the protocol requires the simultaneous use of several bursts of different sizes and power levels in the same TDMA frame. In such a case, in those frames where some or all of the information-bearing bursts are supposed to be omitted, the omitted bursts are replaced with interference-compensating bursts at the compensating frequency that match the energy contents of the corresponding missing information-bearing bursts.

Figure 5:
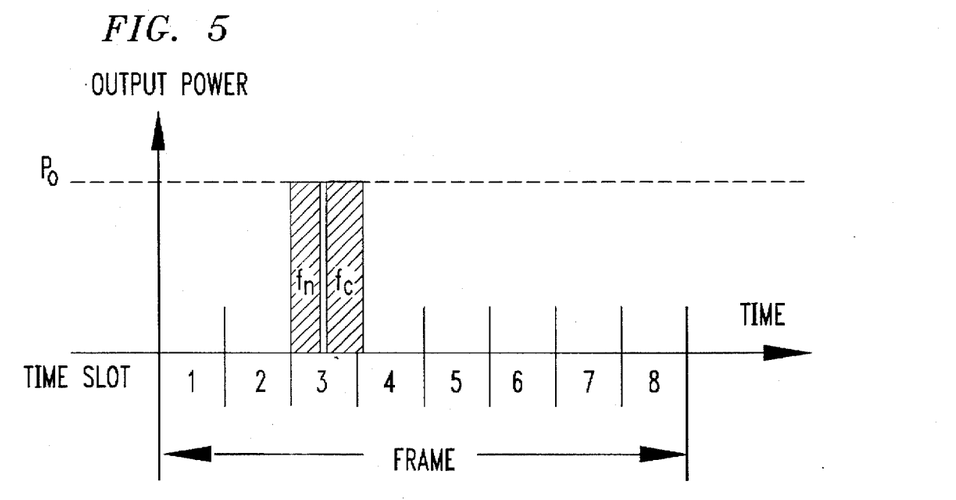
FIG. 5 shows the output power versus time relationship of a single time slot of a frame during which, in accordance with a protocol, a shorter-than-usual information-bearing burst is transmitted, and for a time equal to the difference between the duration of a non-shortened burst and the duration of the shortened burst, a burst extending non-information-bearing interference-compensating signal at the compensation frequency is transmitted.

In accordance with the second technique, information-bearing bursts that are shorter than others are extended in length so that all bursts become equal in size. The extension can be accomplished by transmitting at the compensating frequency, $f_c$, at substantially the same power level, $P_0$, as that of the burst being extended, for a period of time equal in duration to the desired extension, immediately following (or preceding) the burst being extended. FIG. 5 illustrates this embodiment. As in the embodiment of FIG. 3 discussed herein above, the transmitter needs to quickly switch from the frequency $f_n$ of the information-bearing burst, to the frequency $f_c$ of the compensating signal during the extension period. Thus, as can be noted in FIG. 5, for the reasons previously discussed for the embodiment of FIG. 3, a small gap, during which no transmission occurs, is required at the transition. Also, as in FIG. 3, the compensating signal extends beyond the slot boundary for a duration equal to the gap to maintain the total signal energy of the reduced-length information burst plus the compensating signal at the same energy level of a full slot-width information burst. With all bursts having the same duration due to the extension, the invention can be applied as previously discussed to achieve the advantageous reduction in baseband envelope interference. The advantage of this second more complicated technique rather than the first technique described above in a system with variable burst lengths is that, by effectively making the length of all bursts the same, the reduction of the unwanted low-frequency components of the baseband envelope interference can be made more complete. This is particularly important if the protocol requires frequent, rapid switching from bursts of one length to bursts of a different length.

Figure 6:
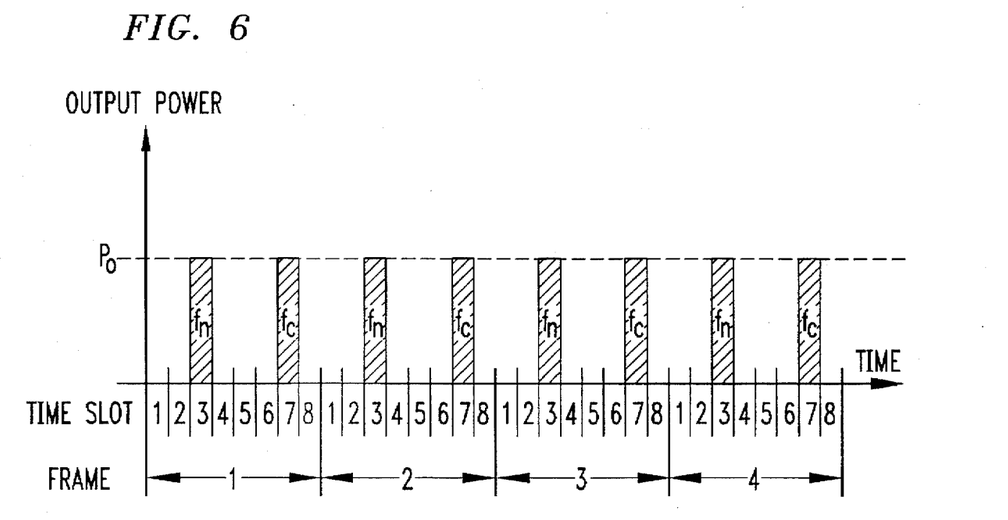
FIG. 6 shows the output power versus time relationship for a mobile TDMA radio transmitter, in accordance with the invention, in which due to interference at the fundamental frame rate, an interference-compensating signal is transmitted in a time slot in every frame.

The embodiment of the invention in FIG. 6 can also be used if signal components at the fundamental frequency of the frame rate cause interference with certain devices, but which devices are not susceptible to signal components at multiples of the frame rate. In accordance with this embodiment, a compensating signal is transmitted at frequency $f_c$ within a time slot in every frame. As shown in FIG. 6, the compensating signal at the same power level, $P_0$, of the information-bearing signal, is transmitted in slot 7 of each frame. Thus, there will be no interference components at the frame rate, but only at twice the frame rate and at multiples thereof.

Figure 7:
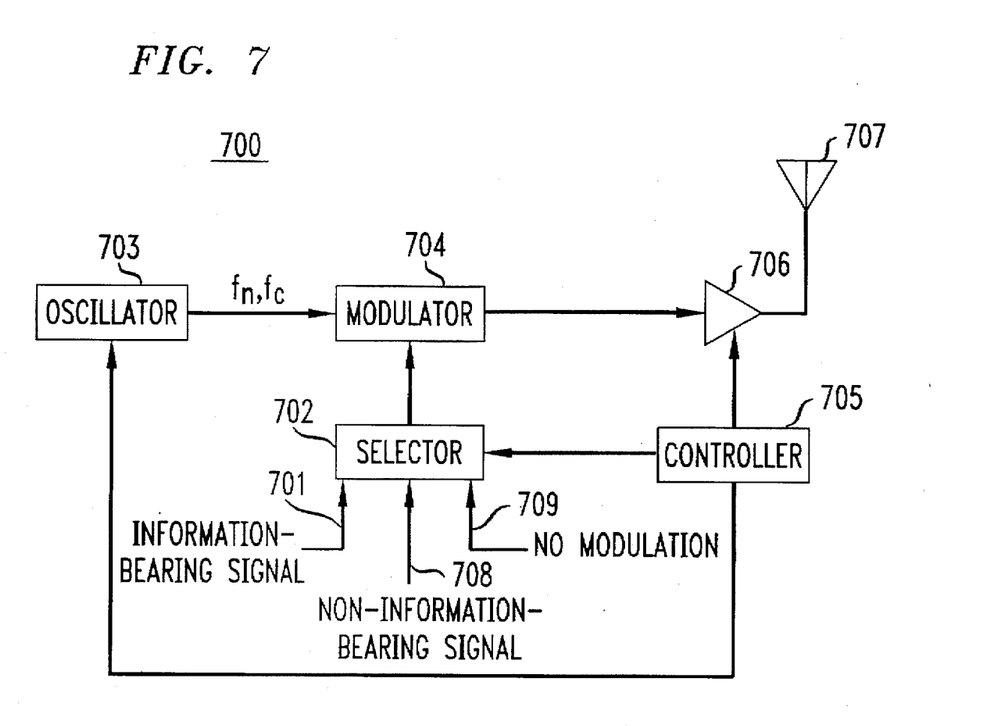
FIG. 7 is a block diagram of a mobile TDMA radio transmitter in accordance with the present invention.

With reference to the simplified block diagram of a mobile transmitter 700 in FIG. 7, an information-bearing signal to be transmitted is inputted on lead 701 through a selector 702, controlled by a controller 705, to a modulator 704, which modulates the signal for transmission with a carrier frequency outputted by a controllable oscillator 703. Oscillator 603 is controlled in frequency by the controller 705, which determines from a system controller (not shown) the frequency $f_n$ at which the transmitter 700 is to transmit its bursts of information. Controller 705 also controls the timing at which the unmodulated carrier output of oscillator 703 changes frequency to the frequency $f_c$ of the interference-compensating signal. Bursts of the modulated information-bearing signal are amplified an amplifier 706, controlled by the controller 705, and passed to an antenna 707. The interference-compensating signal, outputted by the oscillator 703 at the compensation frequency $f_c$, may be modulated by modulator 704 by a non-information-bearing signal inputted on lead 708 to selector 702. Alternatively, the oscillator output at compensation frequency $f_c$ may pass unmodulated by modulator 704, in response to a "no modulation" signal on input lead 709 to selector 702. The output of selector 702 of the information-bearing signal on lead 701, the non-information-bearing signal on lead 708, or the "no modulation" signal on lead 709 are determined by controller 705. Controller 705 has stored in an associated memory (not shown) timing and frame pattern information associated with terminal 700. Accordingly, it "knows" for each time slot of each frame whether the transmitter is in a mode to be 1) transmitting a burst of an information-bearing signal, 2) transmitting an interference-compensating signal, or 3) is in a quiet mode during which no transmission is to take place. Thus it controls oscillator 703 to output a carrier frequency appropriate to the each of the three modes and controls selector 702 to provide the appropriate modulating or non-modulating signal to modulator 704. Controller 705 further controls amplifier 706 to turn-off amplification to produce a zero output during the quiet mode and to amplify its input signal at other times with the amount of amplification being adjusted to achieve the desired transmitted power level. Thus, as previously described, the interference-compensating signal is selected for output during those frames in which the usual steady-state power level of the information-bearing signal is not transmitted at all, is transmitted at a reduced power level, and/or is transmitted for less than its usual time slot duration. Thus, as described, if the protocol requires that no information-bearing signal be transmitted during a frame, the frequency of oscillator 703 is adjusted to $f_c$, and the interference-compensating signal is transmitted in place of the information-bearing burst in either the same or a nearby time slot within the frame. If the protocol requires the information-bearing signal be transmitted at a reduced power level, then controller 705 adjusts the amplification of amplifier 706 during the time slot of the information-bearing burst, adjusts the frequency of oscillator 703 to $f_c$, and selects the interference-compensating signal for transmission during the frame at another time slot and at an appropriate power level necessary to compensate for the reduced-power burst. Similarly, if the protocol requires transmission of an information-bearing burst for less than a time slot, controller 705 adjusts the frequency of oscillator 703 and transmits the interference-compensating signal as an extension of the burst during a duration necessary to compensate for the shortened burst.

The above-described embodiments are illustrative of the principles of the present invention. Other embodiments could be devised by those skilled in the art without departing from the spirit and scope of the present invention.

The invention claimed is:

1. A method for operating a time division Multiple access transmitter (TDMA) comprising the steps of:

transmitting bursts of an information-bearing signal in predetermined ones of frames which each consist of a predetermined number of time slots, the burst in each of said predetermined ones of frames being transmitted at a predetermined carrier frequency within a first predetermined numbered one or more of said time slots for a predetermined duration at a predetermined power level; and in frames other than said predetermined ones of said frames, said other frames being ones in which a burst of said information-bearing signal is not transmitted or is transmitted not at said predetermined power level and/or not for said predetermined duration, transmitting an interference-compensating signal at a compensation frequency different from said carrier frequency, said interference-compensating signal being transmitted within at least a second predetermined numbered one or more of said time slots of said other frames, but within less than all the time slots of said other frames.

2. The method of claim 1 wherein in said other frames said interference-compensating signal is transmitted in the same numbered time slot as the time slot in which bursts of said information-bearing signal are transmitted in said predetermined ones of frames.

3. The method of claim 1 wherein the duration of said interference-compensating signal is equal to said predetermined duration of each of said bursts.

4. The method of claim 3 wherein the power level of said interference-compensating signal is equal to said predetermined power level of each of said bursts.

5. A method for operating a time division multiple access (TDMA) transmitter comprising the steps of:

transmitting bursts of an information-bearing signal in predetermined ones of frames which each consist of a predetermined number of time slots, the burst in each of said predetermined ones of frames being transmitted at a predetermined carrier frequency within a first predetermined numbered one or more of said time slots for a predetermined duration at a predetermined power level; and in frames other than said predetermined ones of said frames, said other frames being ones in which a burst of said information-bearing signal is not transmitted, transmitting an interference-compensating signal at a compensation frequency different from said carrier frequency, said interference-compensating signal being transmitted within at least a second predetermined numbered one or more of said time slots of said other frames, but within less than all the time slots of said other frames.

6. The method of claim 5 wherein in said other frames said interference-compensating signal is transmitted in the same numbered time slot as the time slot in which bursts of said information-bearing signal are transmitted in said predetermined ones of frames.

7. The method of claim 5 wherein the duration of said interference-compensating signal is equal to said predetermined duration of each of said bursts.

8. The method of claim 7 wherein the power level of said interference-compensating signal is equal to said predetermined power level of each of said bursts.

9. A method for operating a time division multiple access (TDMA) transmitter comprising the steps of:

transmitting bursts of an information-bearing signal in predetermined ones of frames which each consist of a predetermined number of time slots, the burst in each of said predetermined ones of frames being transmitted at a predetermined carrier frequency within a first predetermined numbered one or more of said time slots for a predetermined duration at a predetermined power level; and in frames other than said predetermined ones of said frames, said other frames being ones in which a burst of said information-bearing signal is transmitted at a reduced power level less than said predetermined power level, transmitting an interference-compensating signal at a compensation frequency different from said carrier frequency, said interference-compensating signal being transmitted within at least a second predetermined numbered one or more of said time slots of said other frames, but within less than all the time slots of said other frames.

10. The method of claim 9 wherein said interference-compensating signal is transmitted in at least one numbered time slot that is adjacent to the time slot in which a reduced power level burst is transmitted.

11. The method of claim 10 wherein the duration of said interference-compensating signal is equal to said predetermined duration of said burst.

12. The method of claim 11 wherein the power level of said interference-compensating signal is equal to the difference between said predetermined power level and the reduced power level.

13. A method for operating a time division multiple access (TDMA) transmitter comprising the steps of:

transmitting bursts of an information- bearing signal in predetermined ones of frames which each consist of a predetermined number of time slots, the burst in each of said predetermined ones of frames being transmitted at a predetermined carrier frequency within a predetermined one or more of said time slots at a predetermined power level; and in those frames other in which the duration of the burst is less than the duration of said predetermined one or more of said time slots, transmitting an interference-compensating signal at a compensation frequency different from said carrier frequency within at least said same time slot of said other frames, with the burst but within less than all of said time slots of said other frames.

14. The method of claim 13 wherein in each of said other frames in which the duration of the burst is less than the duration of said predetermined one of said time slots, the duration of said interference-compensating signal in each such frame is approximately equal to the difference between the duration of a said predetermined one of said time slots and the duration of the burst in said same frame.

15. The method of claim 14 wherein the power level of said interference-compensating signal is equal to said predetermined power level.

16. A method for operating a time division multiple access (TDMA) transmitter comprising the steps of:

transmitting bursts of an information-bearing signal in frames which each consist of a predetermined number of time slots, the burst being transmitted at a predetermined carrier frequency within a first predetermined numbered one or more of said time slots for a predetermined duration at a predetermined power level; and upon turn on of the transmitter, in at least one frame prior to a frame in which a burst of an information-bearing signal is first transmitted at turn on, transmitting an interference-compensating signal at a compensation frequency different from said carrier frequency within a second predetermined numbered one or more of said time slots, of said at least one prior frame, at a power level less than said predetermined power level.

17. The method of claim 16 wherein said second predetermined numbered one of said time slots is the same numbered time slot as said first predetermined numbered one.

18. The method of claim 17 wherein an interference-compensating signal is transmitted in a plurality of successive frames prior to a frame in which a burst of an information-bearing signal is first transmitted, the power level of the interference-compensating signal in each of such frames being increased from one successive frame to the next.

19. A time division multiple access (TDMA) transmitter comprising:

means for transmitting bursts of an information-bearing signal in predetermined ones of frames which each consist of a predetermined number of time slots, the burst in each of said predetermined ones of frames being transmitted at a predetermined carrier frequency within a first predetermined numbered one or more of said time slots for a predetermined duration at a predetermined power level; and means for transmitting an interference-compensating signal at a compensation frequency different from said carrier frequency in frames other than said predetermined ones of said frames, said other frames being ones in which a burst of said information-bearing signal is not transmitted or is transmitted not at said predetermined power level and/or not for said predetermined duration, said interference-compensating signal being transmitted within at least a second predetermined numbered one or more of said time slots of said other frames, but within less than all the time slots of said other frames.

20. The transmitter of claim 19 wherein in said other frames said interference-compensating signal is transmitted in the same numbered time slot as the time slot in which bursts of said information-bearing signal are transmitted in said predetermined ones of frames.

21. The transmitter of claim 19 wherein the duration of said interference-compensating signal is equal to said predetermined duration of each of said bursts.

22. The transmitter of claim 21 wherein the power level of said interference-compensating signal is equal to said predetermined power level of each of said bursts.

23. A time division multiple access (TDMA) transmitter comprising:

means for transmitting bursts of an information-bearing signal in predetermined ones of frames which each consist of a predetermined number of time slots, the burst in each of said predetermined ones of frames being transmitted at a predetermined carrier frequency within a first predetermined numbered one or more of said time slots for a predetermined duration at a predetermined power level; and     means for transmitting an interference-compensating signal at a compensation frequency different from said carrier frequency in frames other than said predetermined ones of said frames, said other frames being ones in which a burst of said information-bearing signal is not transmitted, said interference-compensating signal being transmitted within at least a second predetermined numbered one or more of said time slots of said other frames, but within less than all the time slots of said other frames.

24. The transmitter of claim 23 wherein in said other frames said interference-compensating signal is transmitted in the same numbered time slot as the time slot in which bursts of said information-bearing signal are transmitted in said predetermined ones of frames.

25. The transmitter of claim 23 wherein the duration of said interference-compensating signal is equal to said predetermined duration of each of said bursts.

26. The transmitter of claim 25 wherein the power level of said interference-compensating signal is equal to said predetermined power level of each of said bursts.

27. A time division multiple access (TDMA) transmitter comprising:

means for transmitting bursts of an information-bearing signal in predetermined ones of frames which each consist of a predetermined number of time slots, the burst in each of said predetermined ones of said frames being transmitted at a predetermined carrier frequency within a first predetermined one or more of said time slots for a predetermined duration at a predetermined power level; and     means for transmitting an interference-compensating signal at a compensation frequency different from said carrier frequency in frames other than said predetermined ones of said frames, said other frames being ones in which a burst of said information-bearing signal is transmitted at a reduced power level less than said predetermined power level, said interference-compensating signal being transmitted within at least a second predetermined numbered one or more of said time slots of said other frames, but within less than all the time slots of said other frames.

28. The transmitter of claim 27 wherein said interference-compensating signal is transmitted in at least one numbered time slot that is adjacent to the time slot in which a reduced power level burst is transmitted.

29. The transmitter of claim 28 wherein the duration of said interference-compensating signal is equal to said predetermined duration of each of said bursts.

30. The transmitter of claim 29 wherein the power level of said interference-compensating signal is approximately equal to the difference between said predetermined power level and the reduced power level.

31. A time division multiple access (TDMA) transmitter comprising:

means for transmitting bursts of an information-bearing signal in predetermined ones of frames which each consist of a predetermined number of time slots, the burst in each of said predetermined ones of frames being transmitted at a predetermined carrier frequency within a predetermined one or more of said time slots at a predetermined power level; and     means for transmitting an interference-compensating signal at a compensation frequency different from said carrier frequency in those particular frames in which the burst has a duration less than the length of said predetermined one or more of said time slots, said interference-compensating signal being transmitted within at least said same time slot with the burst, of said particular frames, but within less than all of said time slots of said particular frames.

32. The transmitter of claim 31 wherein in each of said other frames in which the duration of the burst is less than the duration of said predetermined one of said time slots, the duration of said interference-compensating signal in each such frame is approximately equal to the difference between the duration of a said predetermined one of said time slots and the duration of the burst in said same frame.

33. The transmitter of claim 32 wherein the power level of said interference-compensating signal is equal to said predetermined power level.

34. A time division multiple access (TDMA) transmitter comprising:

means for transmitting bursts of an information-bearing signal in frames which each consist of a predetermined number of time slots, each burst being transmitted at a predetermined carrier frequency within a first predetermined numbered one or more of said time slots for a predetermined duration at a predetermined power level; and     means for transmitting an interference-compensating signal at a compensation frequency different from said carrier frequency within a second predetermined numbered one or more of said time slots at a power level less than said predetermined power level upon turn on of the transmitter, said interference compensating signal being transmitted in at least one frame prior to a frame in which a burst of an information-bearing signal is first transmitted at turn on.

35. The transmitter of claim 34 wherein said second predetermined numbered one of said time slots is the same numbered time slot as said first predetermined numbered one.

36. The transmitter of claim 35 wherein said means for transmitting an interference-compensating signal transmits in a plurality of successive frames prior to a frame in which a burst of an information-bearing signal is first transmitted, the power level of the interference-compensating signal in each of such frames being increased from one successive frame to the next.

37. A method for operating a time division multiple access (TDMA) transmitter comprising the steps of:

transmitting bursts of an information- bearing signal in frames which each consist of a predetermined number of time slots, the burst being transmitted at a predetermined carrier frequency within a first predetermined numbered one or more of said time slots for a predetermined duration at a predetermined power level; and transmitting in said frames an interference-compensating signal at a compensation frequency different from said carrier frequency within at least a second predetermined numbered one of said time slots of said frames different than that first numbered time slot but within less than all of said time slots of said frames.

38. The method of claim 37 wherein the duration of said interference-compensating signal is equal to said predetermined duration of each of said bursts.

39. The method of claim 38 wherein the power level of said interference compensating signal is equal to said predetermined power level of each of said burst.

40. A time division multiple access (TDMA) transmitter comprising:

means for transmitting bursts of an information-bearing signal in frames which each consist of a predetermined number of time slots, the burst being transmitted at a predetermined carrier frequency within a first predetermined numbered one or more of said time slots for a predetermined duration at a predetermined power level; and means for transmitting in said frames an interference-compensating signal at a compensation frequency different from said carrier frequency within at least a second predetermined numbered one or more of said time slots of said frames different than that first numbered time slot but within less than all of said time slots of said frames.

41. The transmitter of claim 40 wherein the duration of said interference-compensating signal is equal to said predetermined duration of each of said bursts.

42. The transmitter of claim 41 wherein the power level of said interference compensating signal is equal to said predetermined power level of each of said burst.

* * * * *